Patented Oct. 30, 1934

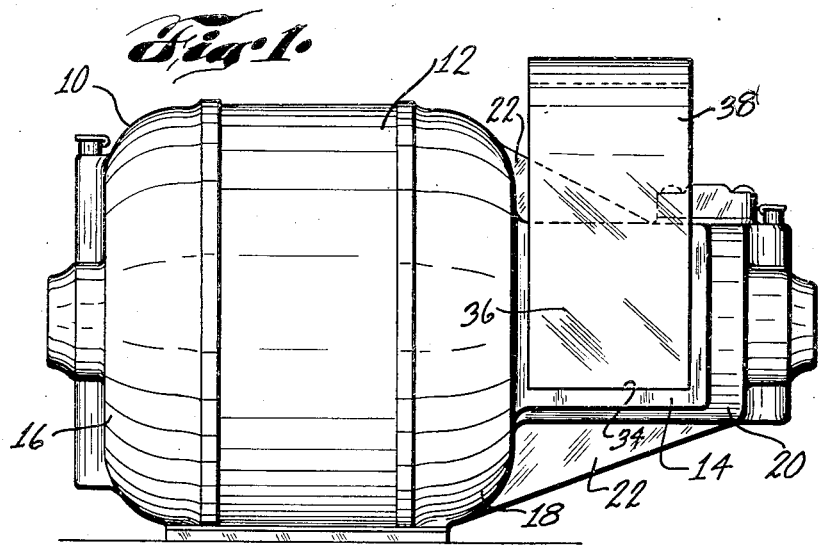
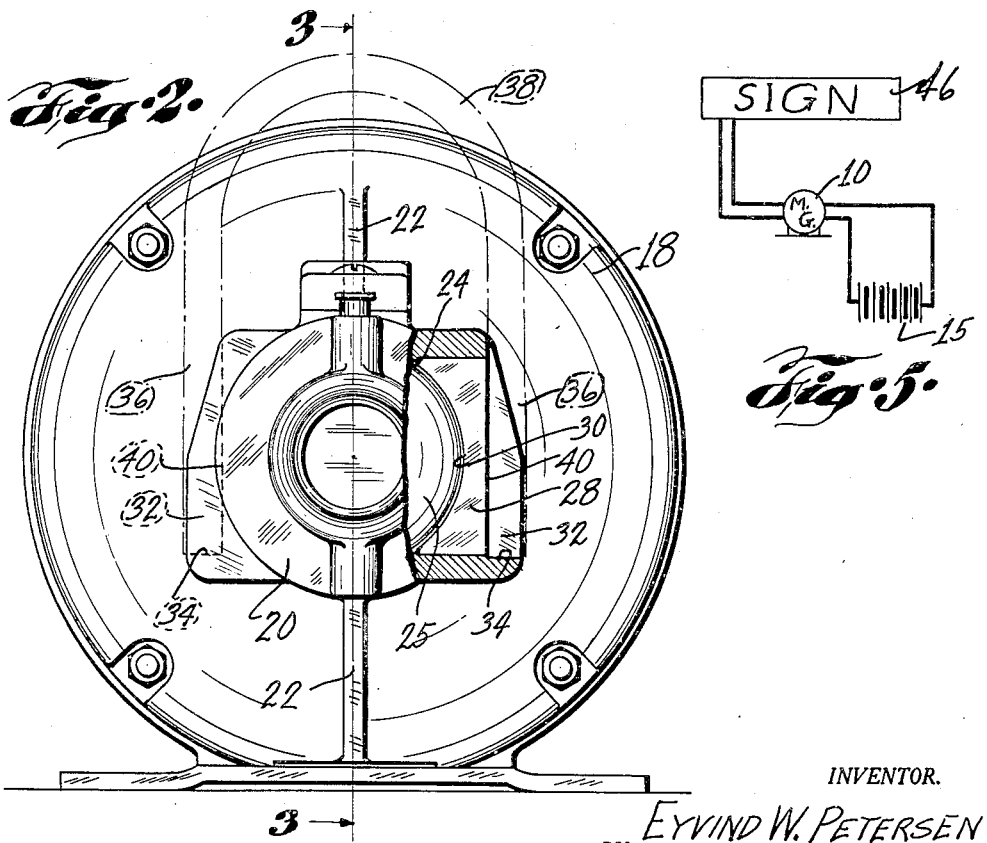

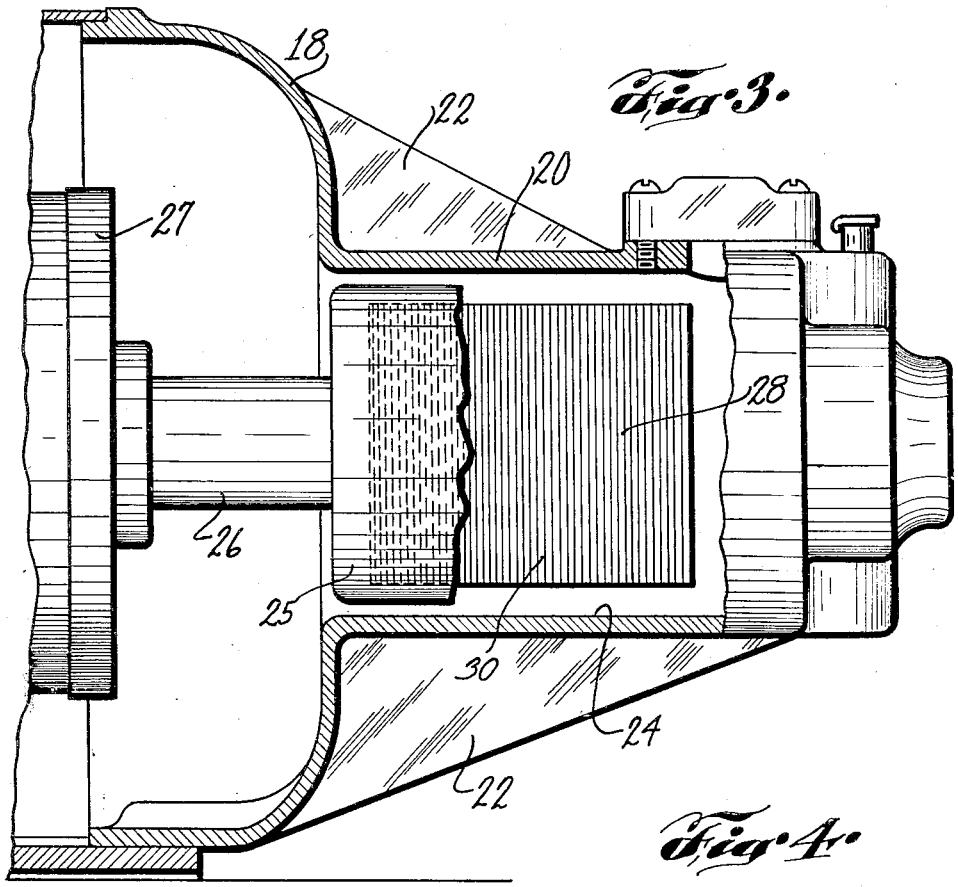
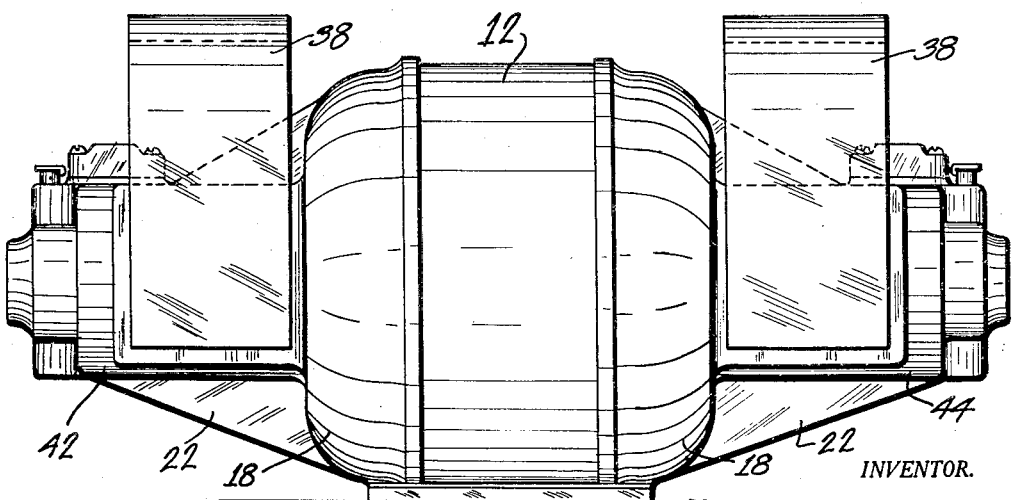

1,978,688

UNITED STATES PATENT OFFICE 1,978,688

MOTOR-GENERATOR ASSEMBLY

Eyvind W. Petersen, Beloit, Wis., assignor to Fairbanks, Morse & Co., Chicago, Ill., a corporation of Illinois Application August 11, 1932, Serial No. 628,333

11 Claims. (Cl. 171—123)

This invention relates to improvements in motor-generator assemblies, and more particularly to improvements in a motor generator combination of a type for use in supplying power to gaseous discharge tubes, such as neon tube signs, employed in electric displays and the like.

Ordinarily, where alternating current power lines are available, gaseous discharge tubes are operated from transformers in circuit relation with the power lines, such means having been found to be efficient and economical. However, if an alternating current source is not available, such as is often the case in rural districts, some other means for energizing neon signs or like apparatus, must be provided, such as, for example, a motor-generator set wherein the motor may be operated from any suitable source of direct current. It is therefore an object of the present invention to provide an improved combination of a generator, suitable to supply the power necessary to operate the neon sign or similar apparatus with which it is to be used, and a direct-current motor, the two being so related as to form a compact power supply unit.

Another object of the invention is attained in a neat and compact combination of a direct current motor, with a high voltage and/or frequency generator forming a sturdy power supply unit for neon signs and like commercial usage, the unit requiring a minimum space, thus making it readily adapted for out of the way mounting, or mounting within the neon sign case, if it be so desired.

A further object of this invention is attained in a compact motor-generator set in which the motor and generator rotating elements are mounted on the same shaft, and the generator field element mounted on one of the motor bearing arms; or a generator unit may be mounted at each end of the motor, each field element thereof being mounted on a motor bearing arm, and the generator rotors secured to the motor shaft on each side of the motor armature.

Further objects and advantages will appear from the following detailed description of parts, and from the drawings of a selected embodiment, in which:

Fig. 1 is a side elevation of a preferred form of motor-generator set to which certain of the present improvements are applied; Fig. 2 is an enlarged end elevation of the motor generator set, certain of the parts being removed and broken away for clearness of illustration; Fig. 3 is a fragmentary section taken along line 3—3 in Fig. 2; Fig. 4 is a longitudinal elevation showing a modification of the motor-generator set of Fig. 1, and Fig. 5 is an exemplary circuit diagram of the motor-generator set and apparatus to operate therefrom.

Referring now to the drawings by numerals of reference, 10 designates, generally, a preferred form of motor-generator set consisting of a motor 12 and a generator 14, the generator being, preferably, of the magneto type, as will more fully appear hereinafter. The motor 12 is usually of a direct current type, preferably constructed to operate from a storage battery 15, or other equivalent supply source. It is to be understood, of course, that if a direct current power system is available, the motor may be wound and connected to operate directly from such source. Motor end bearing arms or end bells 16 and 18, are, by preference, formed as by die casting, the arm 18 being provided with a hollow extension portion 20 which is reinforced by means of ribs 22 to give added strength to the extended structure. This extended hollow structure is provided with a bore 24 for a generator rotating element 25 (Fig. 3) which is mounted on a shaft 26 upon which is, also, mounted the motor armature 27, the shaft being journalled in suitable bearings in the end bell 16 and hollow portion 20, according to Fig. 1. Magneto-generator pole shoes, one of which is shown at 28, are secured within wall portions of the bore 24, each pole shoe having an inner face 30 which may, if desired, be flush with the surface of the bore. These laminated pole pieces are, by preference, secured in place during the die casting of the bearing arm 18 and hollow portion 20. An indented portion 32, one on each side of the extension 20, is provided with a foot or shoulder 34 at the bottom end thereof, to support a leg 36 of an inverted U-shaped permanent magnet 38. A vertical face 40 of the indented portion 32, is so formed as to expose the rear portion of the pole shoe 28, to insure magnetic contact of the shoe with the inner surface portion of the magnet leg. The magnet may be retained in place in the indents 32 by a compression fit, or any other suitable means, such as by bolts, (not shown).

Fig. 4 shows a modification of the power unit to include a pair of magneto-generators 42 and 44 at each end of a motor 12. In this structure, each bearing arm is formed to include a hollow extension, in a manner similar to the arm 18, above described. This double generator unit permits the operation of two or more tubes from the single power source, which may be placed at a point convenient to the display location, in the case of neon tube signs.

Fig. 5 shows a suggested wiring diagram of the power unit herein described, as connected to a piece of apparatus, such as, for example, a neon tube sign 46. The motor of the power unit may be operated from any suitable source, such as a storage battery 15.

It will be understood, of course, that the generator need not be of the exact type shown and described, but that any suitable generator of the required voltage and frequency rating may be accommodated by minor modifications in the bearing arms. As to choice of types of magneto for use in the assemblies described, my present preference is to utilize a single wound magneto driven by a motor adapted to operate say at 4,000 or 4,500 R. P. M. The magneto rotor is wound to deliver say 5,000 volts, at this speed. Such an arrangement has been found suitable for energizing neon tube signs of usual sizes. The speed and output may, however, be varied to meet the requirements of other uses. For example, a double-wound magneto rotor may be employed, as may one utilizing the circuit breaker assemblies employed in connection with magnetos for engine ignition. Where a more continuous magneto output is desirable, the paired machines of Fig. 4 may be staggered in timed relation to each other so as alternately to deliver their maximum energy impulses. Thus a desired continuity of output may be obtained through utilization of the paired magnetos, through slower speed operation of the motor. In certain cases, it may be desirable to use a rotating field type of magneto in lieu of the particular type of magneto herein described. In each case, however, the mounting of the rotating parts of the magneto-generator and the motor on a single shaft, results in a compact set, and eliminates any need for a shaft coupling or added bearings, between the formerly used separate motor and generator shafts. Furthermore, the casting of the bearing arm, extension portion, pole shoes, and the forming of the magnet holding indents in the same die casting operation, greatly decreases the cost of production and simplifies assembly of the sets.

The foregoing description of this invention is directed to only a few of the possible embodiments thereof, and it is to be understood, of course, that substantial modifications may be made without departing from the full intended scope of the invention, as defined by the appended claims.

I claim:

1. A motor generator including a motor comprising a frame, a shaft, a bearing arm having a hollow extension, and secured to the frame, a magneto generator carried by the bearing arm extension, a shaft bearing in said arm common to the generator and motor, the magneto generator including a rotor in said extension, pole shoes embedded in the walls of said extension, and each having opposite faces exposed respectively to the rotor and to the exterior of the extension, and a permanent magnet carried exteriorly of the extension, and engaging the outer faces of the shoes.

2. A motor generator unit including, in combination with a motor frame carrying a bearing arm, a housing formed in the bearing arm, a magneto generator having a magnet exteriorly embracing said bearing arm, a rotor element operatively disposed in said housing, and pole shoes embedded in the walls of said housing portion of the arm.

3. A motor generator unit including, in combination with the motor and a motor frame, an end bell carried by the motor frame, a generator carrier by the end bell and including a rotor operatively mounted within the bell, and a permanently magnetized stator element carried exteriorly of the bell.

4. In a motor generator unit, a motor frame, a cast end bell secured to said frame, a generator carried by the end bell, and a laminated generator stator pole structure integral with said end bell.

5. A motor generator set including a motor frame, a hollow cast bearing arm carried at one end of the frame, a generator carried by the bearing arm and including a rotor operatively disposed within the bearing arm, pole elements carried on the arm, and laminated pole shoes embraced by the metal of the bearing arm.

6. A bearing arm and bracket structure for a motor generator set, including as a unitary casting, a marginal portion for securement to a motor frame, a generator rotor housing outwardly of such portion, exterior bracket portions for the reception of generator field elements, and pole shoes embraced and positioned in assembly by the metal constituting said rotor housing.

7. A motor generator unit, including in combination with a motor comprising a frame, a bearing arm at each opposite end of the frame, a magneto-generator carried by each bearing arm including a magneto stator element embraced by the metal of said bearing arm, a shaft common to the motor and magnetos, and bearings for the shaft located in the bearing arms, and outwardly of the magnetos.

8. In a motor-generator set, in combination, a shaft, a shaft bearing having a hollow extension member thereon, generator pole shoes within the hollow portion of said extension member, and extending through the walls of the member, and a magnet having leg portions adapted to straddle the extension member, and in magnetic contact with the outer surface of said pole shoes.

9. In a motor-generator unit, in combination, a shaft, a die cast shaft bearing arm, an integral extension on said arm having a hollow portion, pole shoes embedded in the walls of said hollow portion, and an inverted U-shaped magnet having portions thereof adapted to contact with portions of the pole shoes.

10. In combination with a motor and generator, a die cast bearing arm having a generator supporting extension member integral therewith, a pair of pole shoes within wall portions of said extension member, indents in the outer surface of the extension member, in line with the pole shoes, the outer surface of the pole shoes being substantially flush with the surface of the indents, and a generator magnet having leg portions adapted to seat in said indents, and in magnetic contact with the outer surface of said pole shoes.

11. In combination with a motor and generator of the magneto type, a shaft, a die cast bearing arm having an extended member integral therewith, a pair of laminated pole shoes embedded in wall portions of said member, an indent on each side of the extended member and in line with the pole shoes, the outer surface of each pole shoe being bared by the indents and made substantially flush with the surface of the indents, an inverted U-shaped magnet adapted to straddle said extension member with its leg portions disposed in said indents, the inner surface of the leg portions being in magnetic contact with the bared surfaces of said pole shoes.

EYVIND W. PETERSEN.